United States Patent [19]
Overstreet

[11] 3,834,059
[45] Sept. 10, 1974

[54] RELEASABLE SINKER USING WATER-SOLUBLE MATERIAL AND RESILIENT ATTACHING MEANS

[75] Inventor: Vern C. Overstreet, Hollywood, Calif.

[73] Assignee: Marguerite M. Haynes, Los Angeles, Calif.

[22] Filed: Nov. 9, 1972

[21] Appl. No.: 303,821

[52] U.S. Cl. .............................................. 43/43.12
[51] Int. Cl............................................. A01k 95/00
[58] Field of Search............ 43/43.12, 43.14, 44.97, 43/42.72

[56] References Cited
UNITED STATES PATENTS

| | | | |
|---|---|---|---|
| 2,308,238 | 1/1943 | Baker | 43/43.12 |
| 2,754,614 | 7/1956 | Yakel | 43/43.12 |
| 3,081,574 | 3/1963 | Wise | 43/43.12 |
| 3,195,262 | 7/1965 | Metzler | 43/43.12 |
| 3,281,983 | 11/1966 | Blankenbecler | 43/43.12 |
| 3,415,005 | 12/1968 | Gilham | 43/43.12 |
| 3,683,542 | 8/1972 | Pecchio | 43/44.97 |

*Primary Examiner*—F. Barry Shay
*Assistant Examiner*—Daniel J. Leach
*Attorney, Agent, or Firm*—Philip A. Mallinckrodt

[57] ABSTRACT

A sinker for fishing lines comprises a weight and water-soluble means for attaching the weight to a fishing line, so that, when the sinker is placed in water, the water-soluble means dissolves and releases the weight. A preferred embodiment includes a weight cast to shape from Portland cement, and a releasable attachment loop tightly wedged into a passage through the weight by means of a water-soluble wedge, e.g., a wedge-shaped lump of sugar.

5 Claims, 5 Drawing Figures

PATENTED SEP 10 1974　　　　　　　　　　　　　　　3,834,059

*3,834,059*

RELEASABLE SINKER USING WATER-SOLUBLE MATERIAL AND RESILIENT ATTACHING MEANS

BACKGROUND OF THE INVENTION

1. Field

The invention is in the field of sinkers for fishing lines, specifically sinkers which are released from the fishing line after they have accomplished their purpose.

2. State of the Art

Sinkers have long been used on fishing lines to either sink the lines deep into the water or to increase the distance a line can be cast from shore or from a boat. It is desirable in many instances, however, to release the weight after the line reaches a desired depth or after it has been cast. Mechanical releases have been used, but these require special equipment and apply to only specialized types of fishing, such as salmon trolling. Heavy weights attached to a fishing line with very light-weight string so that a heavy jerk on the line breaks the string have been tried, but this is generally unsatisfactory because sometimes the string does not break or breaks too soon, or the jerk necessary to break the string injures the bait. Small bags of sand with holes in them for the sand to trickle out have also been tried and found unsatisfactory.

SUMMARY OF THE INVENTION

According to the invention, a weight is provided with water-soluble means for attaching such weight to a fishing line as a sinker. When the sinker is placed in water, the water-soluble attaching means dissolves, and the weight drops away from the fishing line.

In the form presently contemplated as the best mode of carrying out the invention, the weight is molded to shape from an inexpensive cementitious material, preferably Portland cement, with or without an aggregate of some kind, such as fine sand. It is preferably of truncated conical formation for ease of molding and removal from the mold.

A variety of water-soluble means may be utilized for attaching the weight to a fishing line. Thus, a length of cord made of water-soluble material may have one end secured to the weight, as by submersion into the material from which the weight is made prior to setting of such material, as in instances of the weight's being made of a cementitious material or the like, and the other end adapted for attachment to a fishing line, as by tying, or being formed as a loop, etc. Preferably, however, the water-soluble attaching means is made up of an insoluble cord and water-soluble means for attaching the cord to the weight.

In the presently contemplated best mode, the weight is formed with a wedge-shaped passage therethrough into which a length of flexible, water-insoluble material, such as a cord, rubber band, or the like, is releasibly anchored by a wedge of soluble material, such as a wedge-shaped lump of sugar, to provide an attachment loop extending securely from the weight.

THE DRAWING

The best mode presently contemplated of carrying out the invention in actual practice is illustrated in the accompanying drawings, in which:

FIG. 1 is an exploded view showing how the parts of the illustrated embodiment of the invention are assembled;

FIG. 2, a top plan view of the assembled sinker;

FIG. 3, a bottom plan view;

FIG. 4, a view in vertical section taken on the line 4—4 of FIG. 2; and

FIG. 5, a fragmentary vertical section taken along the line 5—5 of FIG. 2.

DETAILED DESCRIPTION OF THE ILLUSTRATED EMBODIMENT

A weight 10, preferably cast to shape from an inexpensive cementitious material, such as Portland cement, with or without an aggregate of some kind, such as fine sand, is provided with a wedge-shaped passage 11 therethrough.

Figure 1:
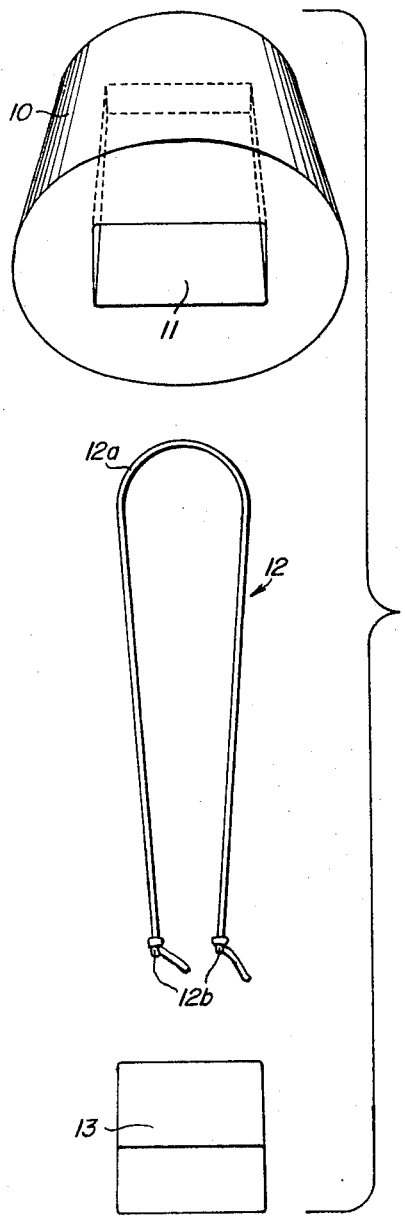
Figure 2:
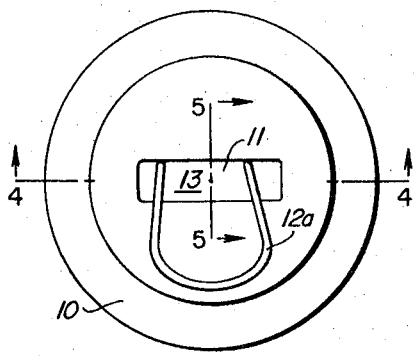
Figure 3:
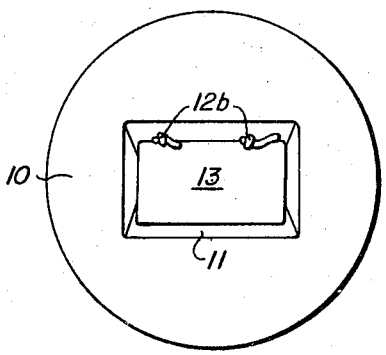
Figure 4:
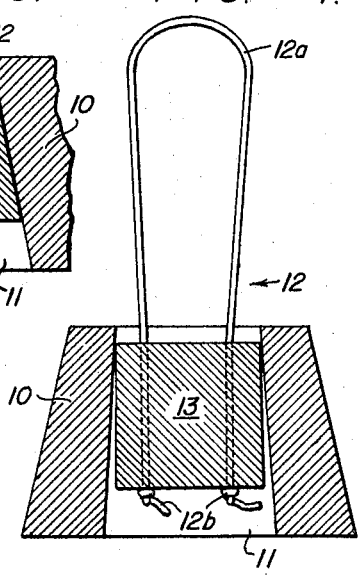

Water-soluble means for attaching such weight to a fishing line is provided in the form of a loop length 12 of a water-insoluble flexible cord or the like (may be a short length of fishing line) secured to weight 10 by wedging in the passage 11 with a water-soluble wedge 13, so as to provide a closed loop portion 12a, FIGS. 2 and 4, for attachment to a fishing line in customary manner. In this illustrated instance, cord length 12 has its opposite ends knotted, as at 12b, respectively, or otherwise enlarged for anchoring purposes. Water-soluble wedge 13 may be of any suitable material, but is advantageously a wedge-shaped lump of sugar.

A fishing line weighted in this manner may be used in casting or trolling. The water-soluble material will gradually dissolve after the attached sinker has accomplished its purpose, permitting weight 10 to drop off and the fishing line to be buoyed upwardly so the baited hook will traverse a fishing zone not normally covered when the usual sinkers are employed and so that the movement of live bait will not be hampered.

Instead of the length of cord 12 having knotted ends for anchoring purposes, an ordinary rubber band or looped length of similar elastic material may be utilized, it being unnecessary to knot the anchoring end or ends since the resiliency and functional characteristics of the material itself will provide secure anchorage.

Figure 5:
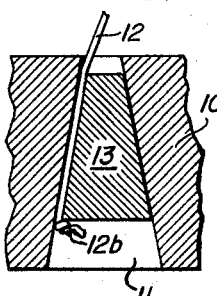

Although the weight 10 is shown as a truncated cone and this shape is preferred because of ease of molding and removal from the mold, such weight can be of any shape, e.g., rectangular, square, oblong, triangular, etc. Similarly, although the passage 11 is shown as wedge-shaped or tapered from one end to the other, it need be that only as a receiving recess for the wedge 13, the remainder of its length being merely for the purpose of passing the loop 12a to the opposite of the weight. Moreover, although the passage 11 is shown as four sided, with all four sides contributing to the taper, see FIGS. 4 and 5, only two opposing sides could provide the taper. It is contemplated that the weight will be made available in a variety of standard weights, such as in increments of one-half oz. from ½ up to 3 or more ounces.

It should be realized that, within the very broad preview of the invention, the water-soluble attaching means for the weight may take a variety of diverse forms. Thus, a looped or unlooped length of a water-soluble material could be merely threaded through a hole in the weight or could even be glued to the weight, dissolving thereof accomplishing release of such weight. Again the looped or unlooped length of material could be water-unsoluble, as previously indicated, and a water-soluble glue or other adhesive utilized for attaching it to the weight.

Whereas this invention is here specifically illustrated and described with respect to an embodiment presently contemplated as the best mode of carrying it out, it should be realized that the scope of this disclosure is defined by the claims.

I claim:

1. A sinker for fishing lines, comprising a weight provided with a wedge-shaped passage therethrough; a length of resilient water-insoluble material extending into said passage and adapted to be attached to a fishing line; and a water-soluble wedge releasably mounted in said passage, said wedge having at least a portion of its cross-sectional area larger than the minimum cross-sectional area of said passage for securing a portion of the length of resilient water-insoluble material into said wedge-shaped passage.

2. A sinker in accordance with claim 1, wherein the length of water-insoluble material is a rubber band.

3. A sinker in accordance with claim 1, wherein the water-soluble wedge is a wedge-shaped lump of sugar.

4. A sinker in accordance with claim 1, wherein the weight is a cementitious material cast to shape.

5. A sinker in accordance with claim 4, wherein the cementitious material is Portland cement.

* * * * *